United States Patent
Hoefler

[19]

[11] Patent Number: 5,820,308
[45] Date of Patent: Oct. 13, 1998

[54] PLUNGE MILLING CUTTER

[75] Inventor: Brian D. Hoefler, Rockford, Ill.

[73] Assignee: Ingersoll Cutting Tool Company, Rockford, Ill.

[21] Appl. No.: 792,694

[22] Filed: Jan. 29, 1997

Related U.S. Application Data

[62] Division of Ser. No. 335,658, Nov. 8, 1994, Pat. No. 5,639,189.

[51] Int. Cl.⁶ ........................................... B23C 5/06
[52] U.S. Cl. ................... 407/40; 407/53; 407/113
[58] Field of Search ................ 407/40, 35, 34, 407/53, 42, 113, 114, 115, 116

[56] References Cited

U.S. PATENT DOCUMENTS

| | | | |
|---|---|---|---|
| 4,531,864 | 7/1985 | Bylund | 407/114 |
| 5,209,611 | 5/1993 | Drescher | 407/114 X |

FOREIGN PATENT DOCUMENTS

| | | | |
|---|---|---|---|
| 0104517 | 4/1984 | European Pat. Off. | 407/40 |
| 000876940 | 5/1953 | Germany | 407/40 |
| 31038812 | 2/1986 | Japan | 407/53 |
| 361086116 | 5/1986 | Japan | 407/53 |

*Primary Examiner*—Daniel W. Howell
*Assistant Examiner*—Henry W. H. Tsai
*Attorney, Agent, or Firm*—Fitch, Even, Tabin & Flannery

[57] ABSTRACT

A plunge milling cutter is shown which displays an unusually high cutting edge density with positive cutting geometry derived from the configuration of the rake surfaces of its hard metal cutting inserts, notwithstanding their generally parallelepiped form.

7 Claims, 4 Drawing Sheets

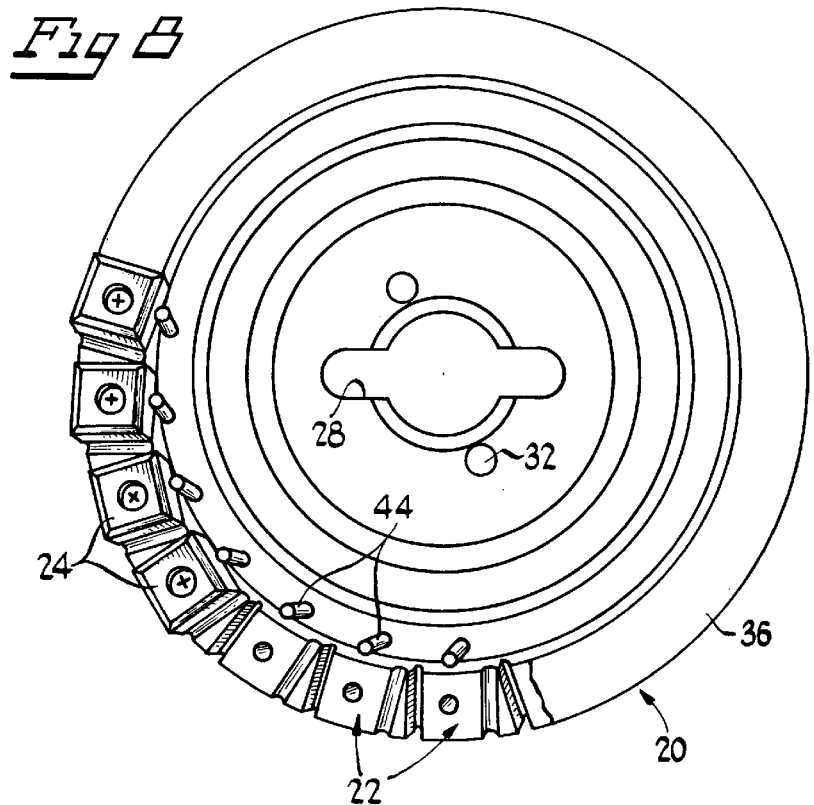
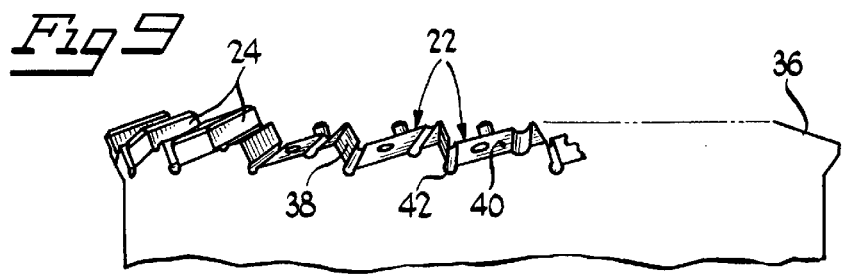
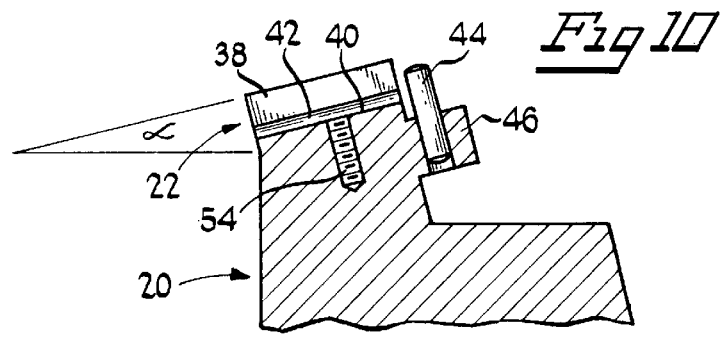

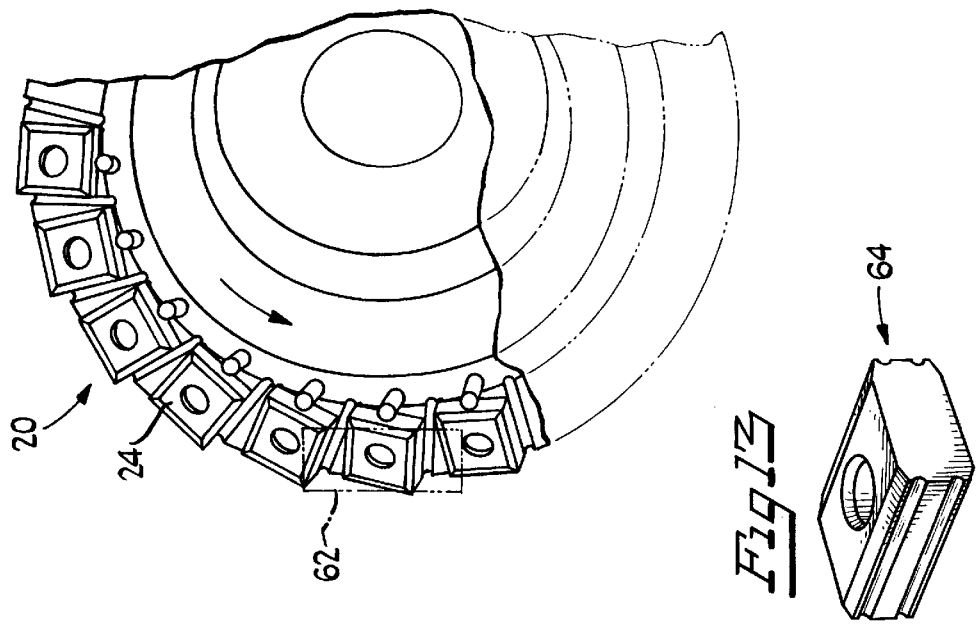
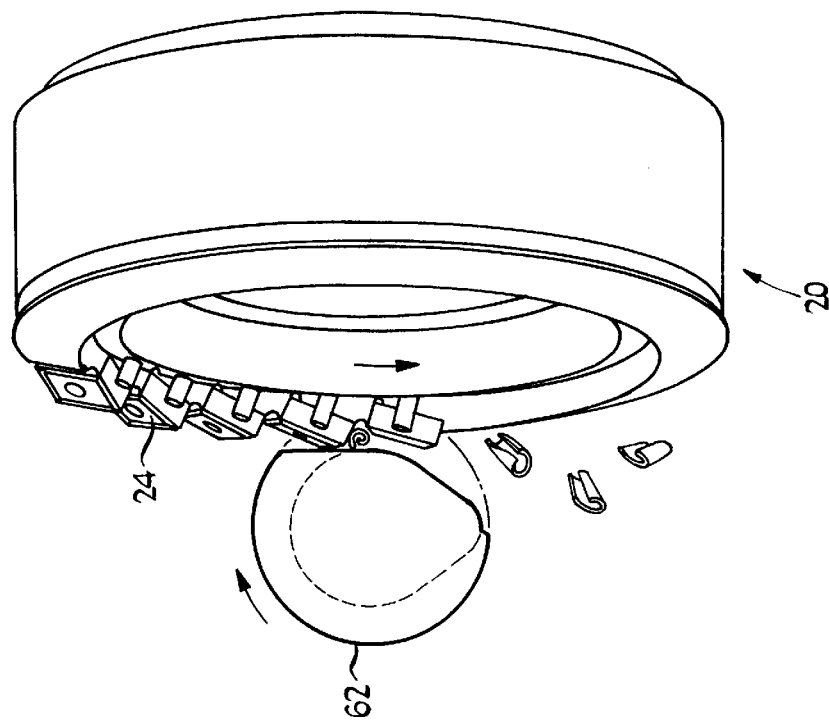

PLUNGE MILLING CUTTER

This is a division, of application Ser. No. 08/335,658, filed Nov. 8. 1994, now U.S. Pat. No. 5,639,189, issued on Jul. 7, 1994.

This invention relates to milling tools, and particularly to a high-density face mill for the heavy-duty plunge cutting of metal, and to an indexable cutting insert especially adapted for use in a high-density plunge-milling cutter.

The face mill and insert of this invention were developed for the rough machining of the cam lobes of the cam shafts of internal combustion engines. In such service, the cam lobe profile may be milled from a near net-shape forging or casting, or from a cylindrical steel bar, which have been previously turned or milled to provide end and interlobe journals. The lobe locations of the shaft remain as blanks which are then milled into lobe form by plunge feeding the cutter into each lobe blank in turn for the removal of from 20% to 60% of the metal of the blank, depending on the starting stock, in a single revolution of the cam shaft in just over four seconds. The machining operation is illustrated and described in U.S. Pat. Nos. 4,551,048 and 4,624,610.

The attainment of metal removal rates of such high magnitude with acceptable tolerances and tool life in the described service was the object of this invention.

Tool life, or more precisely, the end of the effective life of the collective edges of a milling cutter, is less a precise condition of the tool than of the monitored power demand and the acceptability of the part or surface produced. In the described application, the characteristics of the cup-shaped milling tool and of the indexable cutting inserts of the invention are such as to provide from 130 to 170 minutes of actual cutting time at surface cutting speeds of approximately 750 feet per minute with a feed rate of 85 inches per minute at maximum depth of cut, which is increased at lesser depths to maintain chip load, i.e., to take maximum advantage of available spindle power, all within a machining cycle of from 4 to 4.5 seconds per lobe. The cutter is plunged into the lobe blank for the initiation of the cut and the cam shaft then rotated to further feed the lobe blank into the rotating cutter while the cutter slide is appropriately advanced into and retracted from the blank under numerical control to define the lobe of the cam.

One hundred thirty to one hundred seventy minutes of cutting time equates to a minimum of four hours of shift time of automated, unattended manufacture, given the time required to index the cam shaft from lobe to lobe, and transfer time while the completed workpiece is removed and replaced. Tool-changing time in automated repetitive manufacture in a dedicated set up is typically determined by in-process gauging of the workpiece in the machine to determine when the workpiece no longer meets the tolerance standard established for the piece.

The milling tool is then replaced by another and moves to the tool room to have its cutting inserts indexed to present a fresh, unused cutting edge of each insert, or replaced as needed for the same purpose.

Satisfactory milling for such a length of time in such strenuous service is made possible in accordance with the invention by the concentration of on-edge cutting inserts in near touching contact in an attitude in which each insert provides over its clearance surface a chip-receiving space for the next insert to enter the cut. The almost shingled relationship of successive inserts without suffering unfavorably negative cutting geometry is made possible by the specially formed rake surfaces of the insert. These allow a substantial heeling (high clearance) of the generally block-shaped inserts of the milling cutter without the excessively negative rake that would otherwise result from the generally rectangular parallelepiped insert configuration, and yet provide eight cutting edges when the major faces are square (four cutting edges when the major faces of the insert are oblong), all of positive rake relative to their adjacent major face, and of near neutral true rake and of positive inclination (effective shear) when mounted in the beveled cutter body.

SUMMARY OF THE INVENTION

The face milling cutter of the invention has a thick-walled cup-shaped body of high torsional rigidity, which is machined at its open end to provide multiple inclined insert pockets in peripheral saw-toothed array. Each pocket holds a block-shaped, on-edge indexable cutting insert with only slight spacing from its peripherally neighboring inserts, and with its cutting edge disposed at a negative radial rake in a plane normal to the rotational axis and at an outwardly and downwardly sloping bevel angle, so as to sweep a substantially conical path about the tool axis with the apex of that path in front of the cutter. In the described array, the downwardly and rearwardly sloped insert seats provide a space between the workpiece and the clearance face of each insert and the rake face of the following insert into which to receive the chip or chips generated by the cutting edge of the following insert.

The rotational axis of the tool intersects the rotational axis of the cam shaft at an angle such that the conical cutting-edge path is essentially parallel to the cam shaft axis in the plane of the two rotational axes.

The high density of on-edge cutting inserts of the cutter of the invention (18 to 22 cutting edges on a diameter of 6 inches) is made possible with advantageous cutting geometry by the cutting insert of the invention. It is basically of flat rectangular parallelepiped form in which the narrow faces of the insert provide the rake faces, and the major faces of the insert constitute the flanks or clearance faces. The narrow faces are grooved along and parallel to the major clearance faces to provide a positive sharp cutting edge which is strengthened by imposing on the clearance face, along the cutting edge, a shallow chamfer which serves as the primary clearance land behind the cutting edge. The hook shape of the cutting profile resulting from the adjacent groove in the narrow face, combined with the negative radial rake of the cutting edge, creates effectively positive cutting geometry notwithstanding the otherwise excessively negative heeling disposition of the insert in the cutter body.

DESCRIPTION OF THE DRAWINGS

The invention is hereafter described in detail in conjunction with the accompanying drawings, in which:

FIG. 8 is a plan view of the milling cutter from which a number of the inserts have been removed to show the insert seats;

FIG. 9 is a fragmentary elevational view of the cutter body affording a further view of the insert seats; and FIG. 10 is a fragmentary sectional elevation of the cutter body taken on the axis of an insert locator pin;

FIG. 11 is an oblique elevational view of the cutter in action on a partially milled cam shaft lobe, which is seen in end elevation;

FIG. 12 is an oblique elevational view rotated 90° from that of FIG. 11, i.e., transversely of the cam shaft workpiece, and showing in broken lines the outline of the cam lobe in least projection, and in relation to the cutting edges of the cutting tool;

FIG. 13 is an oblique view of an alternative form of insert in accordance with the invention, which is rectangular in plan rather than square;

DESCRIPTION OF THE PREFERRED EMBODIMENT

Figure 1:
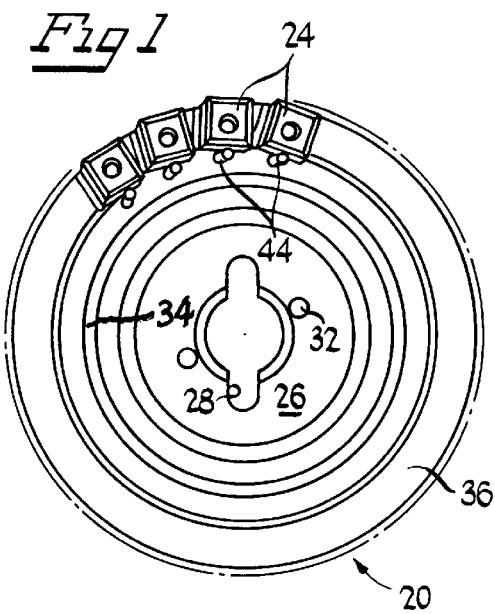
FIG. 1 is a plan view of the cutter of the invention.
Figure 2:
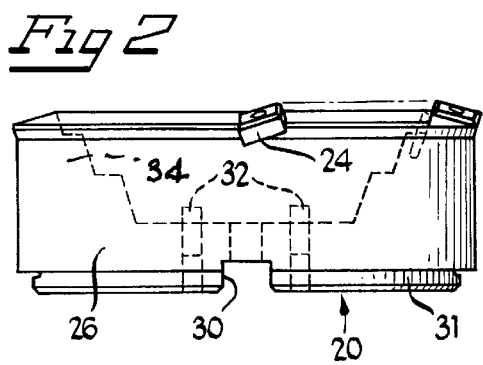
FIG. 2 is an elevational view thereof.
Figure 3:
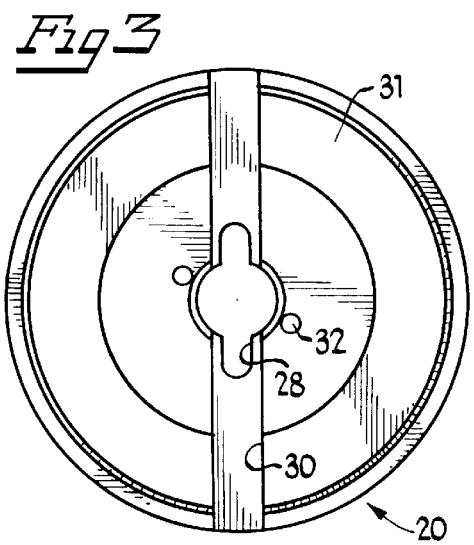
FIG. 3 is a bottom end view of the cutter.

The plunge-milling cutter of the invention takes the form of an outwardly cylindrical, heavy-walled, cup-shaped body 20 whose rim is milled and ground to provide a multiplicity of contiguous insert pockets 22 about the face of the cutter, each to hold a hard metal cutting insert 24 of particular configuration in a particular attitude so as to present its flank and rake surfaces to the workpiece in a predetermined way.

The thick bottom wall 26 of the cup-shaped cutter body is bored and milled to provide a central hole and cross-slot 28 to receive the T-head of the spindle draw bar of a quick-change spindle, or the pilot shaft of a more conventional spindle. The bottom surface is milled to provide a diametrical keyway 30, aligned with the cross-slot 28, to receive the drive keys of the spindle face. Diametrically opposed pins 32 extending upwardly from the bottom wall into the interior space of the cutter body are engaged by the rotation of the T-head of the draw bar as it clamps the cutter body to the spindle face axially and rotationally. Also for use with quick-change spindles, the bottom surface of the cutter body is provided with an integral seating ring 31 whose facing and peripheral surfaces are ground for closely mated fit to the recessed face of such a spindle.

The sidewalls 34 of the cutter body narrow in two steps from the heavy bottom wall 26 so that, elementally, the cutter body may be thought of as a base plate surmounted by successively narrower integral rings of which the uppermost carries the cutting inserts 24.

In blank form, i.e., before the insert pockets 22 are milled and ground, the upper edge surface 36 of the cutter body is beveled at the cone angle α to which the inserts will be set (FIG. 10), but the beveled surface yields to a generally saw-tooth configuration (FIGS. 8 and 9) as the insert pockets 22 are machined.

The insert pockets are best seen in FIGS. 8 to 10 inclusive.

Only the upper edge of the rear seating surface 38 of the insert pocket (FIG. 10) remains from the original bevel surface of the tool body after the insert seats are machined. The bottom seating surface 40 of the pocket, which provides the base for the major face of the insert, is a plane surface which is tilted radially outwardly and downwardly at the aforementioned bevel angle α, and tipped rearwardly and downwardly at a heeling angle selected in conjunction with the rake angle of the cutting insert 24 to provide effective cutting geometry, and to allow a space in front of the rake face into which to receive the chip curled from the workpiece by the cutting edge. In the illustrated instance, the bevel angle α is 15°, and is determined by the design of the cam-milling machine, while the heeling angle of the bottom seating surface is 16°.

The rear seating surface 38 of the insert pocket is a plane surface perpendicular to the bottom seating surface 40 and angled with respect to a radial plane so as to present the parallel cutting edge of the insert at the desired angle of inclination.

To facilitate the simultaneous milling and grinding of both seating surfaces of the insert pocket, a diagonal kerf 42 is cut at their juncture to permit both surfaces to be finished by the pass-through radial feed of a grinding wheel, and to prevent the stress concentration that would otherwise occur if those surfaces were to meet in a sharp corner. As the through-grinding finishing technique is desirable from the standpoint of runout tolerance of the cutting edges, allowing cutting edge runout to be held to 0.0005", a radially inner seating surface, as such, is dispensed with, and the third-axis reference of the insert provided by a separately-installed, upstanding locator pin 44.

This is perhaps best seen in FIG. 10, from which it will be apparent that the uppermost ring element of the cutter body 20 is turned to provide an inwardly extending annular ledge 46. Alongside each insert pocket, a hole is drilled and reamed through the ledge, on an axis perpendicular to the plane of the major seating surface 40 of the pocket, to receive the pin 44, a hardened dowel pin, in a drive fit. The undercut of the ledge 46 is preferably a little deeper axially than a half-length of the dowel pin 44, for, in the event of cutter mishap, the hardened dowel pin will shear at the upper surface of the ledge. The undercut permits the clearing of the pin remnant by tapping it on through.

The insert 24, shown in detail in FIGS. 4 to 7 inclusive, is a block of hard metal, e.g., sintered tungsten carbide, of generally square parallelepiped configuration. It is located in its pocket by the engagement of three of its mutually perpendicular surfaces with the three locating references of the pocket, namely, the bottom seating surface 40 to engage a major seating surface 48 of the insert, the upstanding rear seating surface 38 of the pocket, to engage that lesser edge surface 50 of the insert which is parallel to the selected cutting edge, and the upstanding locator pin 44 to engage another edge surface 50 of the insert, perpendicular to the selected cutting edge. The insert 24 is firmly held in engagement with all three references by a single countersink-head retainer (not shown) passed through a doubly countersunk through hole 52 centered in the major faces 48 of the insert. The retainer may be a machine screw received in a more or less central tapped hole 54 in the bottom seating surface 40 of the pocket, appropriately oriented according to the "bent-screw" principle of U.S. Pat. No. 3,662,444-Erkfritz to bias the insert 24 against all three locating references, or it may take other specific forms known to the art.

In instances where the interlobe clearance of the cam shaft is minimal, it may be necessary to omit the locator pins 44, in which case, the orientation of the force exerted by the retainer is shifted to provide a lateral seating force directed toward the rear locator surface 38 of the insert pocket, rather than diagonally of the insert, as when the pins 44 are used.

It may further be noted that the bottom seating surface 40 of each insert pocket 22 is grooved at its forward edge, parallel to the rake face of the insert, to provide additional space for the development of the chip.

As earlier said, the general overall configuration of the insert 24 is that of a parallelepiped. In the form illustrated in FIGS. 4 to 12, it is square in plan, its two identical plane, parallel major surfaces 48 serving respectively, and, in turn, as its bottom seating surface and its upper clearance surface, depending upon which of its eight available cutting edges is presented for cutting service.

Each of the four lesser edge surfaces 50 of the insert provides two cutting edges 56, one at each juncture with one of the two major faces 48 of the insert. These edges are modified from right-angular intersection by two edge-sharpening grooves 58 of circular cross-section in each edge surface 50 of the insert, parallel to the major surfaces 48 adjacent thereto. Each groove 58 would intersect the extended adjacent major surface 48 of the insert in a cusp which, although advantageously positive, would be too weak to withstand the cutting forces on the insert when heeled at 16°, in the illustrated case. The cutting edge 56 is therefore reinforced by chamfering the edges of the major insert faces, at 9° as illustrated in FIGS. 4 to 7 inclusive, which results in a primary clearance land 60 disposed at a net clearance angle of 7° when the insert is mounted in the cutter body. As the chamfering of the major surface 48 lowers the cutting edge along the cross-section of the groove 58, it intersects the groove in a cusp that may, if desired, be blunted by a touch grind at an angle of from 70° to 90° to the primary clearance land 60, to a width of up to 0.007" (shown in exaggerated scale in FIGS. 6 and 7), to strengthen the edge.

Figure 4:
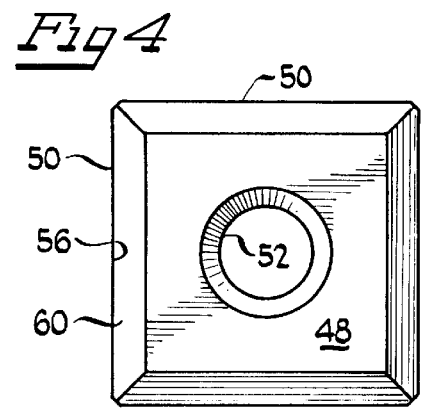
FIG. 4 is a plan view of a representative one of the multiplicity of on-edge cutting inserts of the milling cutter of FIG. 1.
Figure 5:
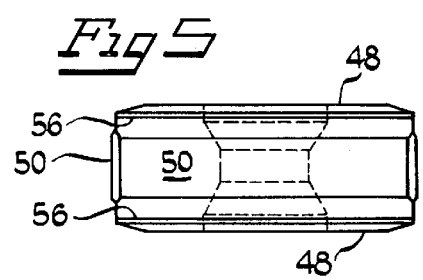
FIG. 5 is a side elevation of the insert of FIG. 4.
Figure 6:
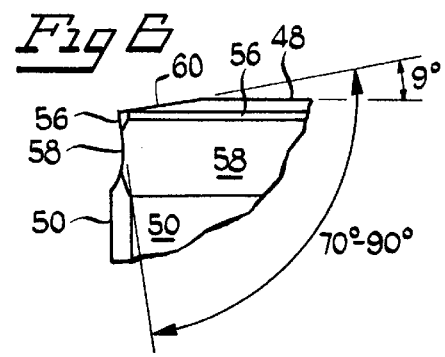
FIG. 6 is a fragmentary enlargement of FIG. 5 to provide raked face detail.
Figure 7:
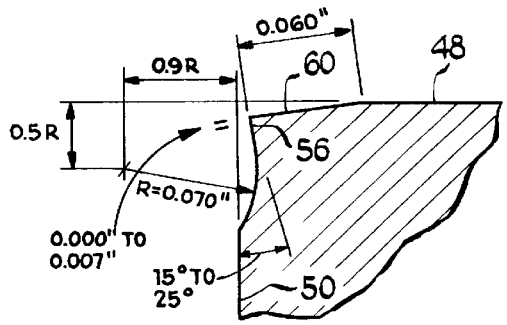
FIG. 7 is a fragmentary sectional view taken on the line 7—7 of FIG. 4, with further configurational detail.

The dimensions shown in FIG. 7 are proportionally illustrative of the insert of FIGS. 4 and 5 with overall plan dimensions of ⅝ "square, and may be varied for other sizes.

The grooving of the four edge surfaces 50 of the insert to sharpen the cutting edges 56 shifts the cutting edges 56 inwardly of the insert, receding from the initial planes of the edge surfaces 50, which remain as raised central bands which meet at the corners of the insert, where they are relieved by a small chamfer which may be pressed or ground in the insert.

Depending upon the degree of blunting, if any, of the cusp at the intersection of the groove 58 with the surface of the primary land 60, a tangent to the groove at its upper edge will preferably make an angle of from 15° to 20° with the adjacent central band of the edge surface 50 of the insert. As the insert when installed in the cutter body is heeled at an angle of 16°, the grooved rake face 58 of the insert at the cutting edge 56 may therefore range from slightly positive to slightly negative true rake but with positive effective shear as presented to the workpiece, i.e., with the rotational axis of the cutter angled away from perpendicular to the axis of the cam shaft by the bevel angle α of the cutter, as in FIG. 11, so that the sweep of the cutting path through the lobe blank 62 is nominally parallel to the cam shaft axis in the common plane of the cutter and cam shaft axes.

However, as the rake face 58 is disposed with a positive inclination and near neutral true rake, it enters and moves through the cut diagonally, i.e., in a slashing motion as well as a shearing motion, effectively improving the overall geometry compared to a shearing action alone.

This will be evident from FIGS. 11 and 12, which show the cutter axis angularly offset from perpendicularity to the cam shaft axis by the amount necessary to present the beveled cutting path essentially parallel to the cam shaft axis as the cutter is plunged into the workpiece. As shown by the solid partial outline of the cam lobe 62 in FIG. 11, the cutter has entered the lobe quadrant of maximum metal removal with the shortest cutting path. The cam blank is fed into the cutter by clockwise rotation, as seen in FIG. 11, with the cutter in right-hand rotation (viewed from behind the spindle). Inasmuch as the lobe blank is feeding "over the top" into the downward sweep of the cutter, the cut being made is a climb cut, i.e., with the chip thickest at point of entry and thinnest at completion of the cut.

As each cutting insert initially contacts the workpiece at maximum depth of cut, its entry into the cut is attended by the shock of collision, requiring that cutter body 20 be rigid and the spindle and workpiece rigidly mounted. The operation is attended with substantial noise, which, however, has been lessened by the cutter of the invention by virtue of the high density of its cutting edges 56, viz., 21 on a diameter of six inches (3.5 per inch) with the result that on the heaviest cut (FIG. 11), there is always one insert in the cut. This greatly reduces the resilient rebound of the workpiece, both torsional and flexural, thus reducing the level of noise in the cutting operation.

The economical achievement of high density of cutting edges commensurately with available spindle power in the plunge milling context necessarily involves the engineering resolution of conflicting demands of space and function, which are accomplished with the indexable on-edge cutting insert 24 of the invention.

As an essentially square block, the insert provides eight cutting edges at the intersections of its major and lesser surfaces. The maximum number of such inserts which can be accommodated on a given cutter diameter depends upon the width of the chip that must be taken with each cut at the desired cutting geometry. As seen in FIG. 12, where the insert just above center line is entering the cut as the insert on center is leaving, the length of the cutting edge is foreshortened in projection in the cutting direction, which itself changes in the cut. In short, for a given cam face width, the cutting edge must be longer than the cam face width if the cam lobe is to be machined in one plunge-feeding revolution of the lobe blank.

The required cutting edge length thus determines the minimum peripheral dimension of a square insert as well, and the maximum number of inserts which can be accommodated at a given cutter diameter.

Clearance from the workpiece to receive the curling chip is likewise a major design consideration in the high density milling of steel, and other ductile metals. Basically, the only space available is the triangular space defined by the edge surface of the insert in the cut, the major clearance face of the insert which preceded it in the cut, and the surface of the workpiece (see FIG. 11). This space is created by depressing the trailing edge of the insert to a heeling or clearance angle of 16°, which, in a conventional square block insert, would produce substantially negative cutting geometry.

The unacceptably destructive and power-consuming effect of that geometry is overcome by the insert of this invention whose multiply-grooved edge surfaces provide positive cutting geometry within themselves and when drastically heeled, which is then rendered further positive with respect to the workpiece by its rotative positioning with a positive inclination angle for slashing entry into the cut.

The achievement of positive inclination angles, also sometimes referred to as "effective shear", in beveled face mills by the use of negative apparent radial rake is itself now an understood phenomenon explained in machining textbooks, for example, Machining Science and Application, Kronenberg, Pergamon Press, 1966, Chapter 5, pp. 85, 86, and earlier, as in U.S. Pat. No. 2,186,417-Charles E. Kraus, 1940, assigned to a company related to the assignee of this invention.

The relationship of true rake to apparent radial rake, and of effective shear, or angle of inclination, to apparent shear, or axial rake, is given by the following equations, paraphrasing the foregoing textbook reference:

tangent (true rake)=[tan (axial rake)×cos (bevel angle)]+[tan (radial rake)×sin (bevel angle)]

tangent (effective shear)=[tan (axial rake) ×sin (bevel angle)]-[tan (radial rake) ×cos (bevel angle)]

Figure 14:
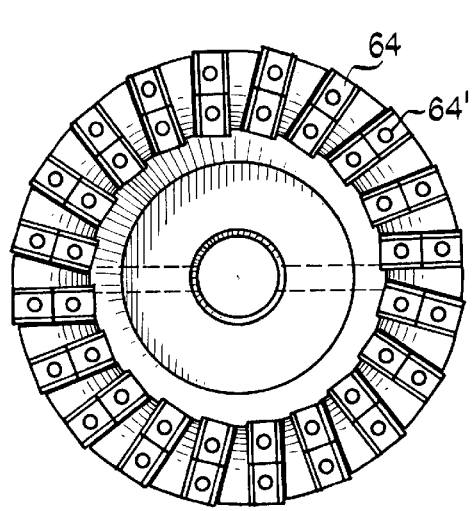
FIG. 14 is a plan view of a milling cutter in accordance with the invention adapted for cutting the wider lobe faces of cam shafts for heavy-duty engines.
Figure 16:
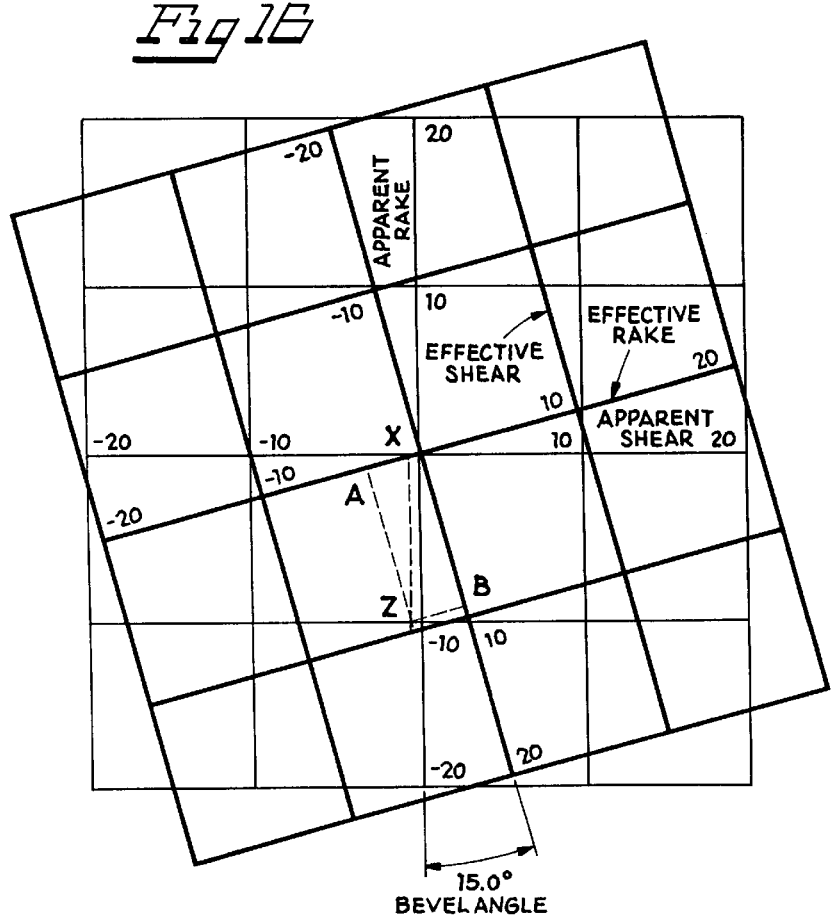
FIG. 16 is a diagram of the relationship of the apparent rake and shear of a cutter beveled at 15° to the resulting effective rake and shear.

These mathematical relationships are represented for a bevel angle of 15° by the chart of FIG. 16, the counterparts of which will be found in the aforementioned U.S. Pat. No. 2,186,417 for bevel angles of 30° (FIG. 13) and 45° (FIG. 14).

In FIG. 16 hereof, the true rake and effective shear (angle of inclination) are shown for the preferred embodiment of the cutter of the invention with the cutting edges of the inserts blunted to an extent such that the grooved rake surface of the insert has an apparent axial rake (apparent shear) of −1°, and an apparent radial rake of −10°. Projecting those values to the coordinate axes skewed at 15°, and having due regard to the sign of the resulting values, it will be seen that true rake is actually ∼−4°, while the effective shear angle (angle of inclination) is positive at a value in excess of 9°.

The favorable resulting geometry and the cutting edge density achievable are believed largely responsible for the relatively quiet operation of the cutter notwithstanding the very high metal removal rates in the described service.

While the milling cutter of the invention has been here defined in the conventional terminology of face-mill geometry, it is recognized that the feeding direction of the cutter relative to the work, i.e., the camshaft of the illustrative example, is different from conventional face mill feed. That is, whereas a face mill, whether or not beveled, is fed in a direction perpendicular to the spindle axis, the feeding direction of the illustrated cutter is initially perpendicular to the bevel as the cutter plunges to cutting depth, and then essentially tangential to the bevel as the work piece rotates through its cycle.

The invention has been illustrated and described thus far in connection with its preferred form of insert 24, namely the square block form, preferred for the economies to be realized from its eight indexable cutting edges. It will be appreciated, however, from the foregoing discussion of density limitation of square inserts on a given diameter by the required length of cutting edge, that any necessary increase in the length of the cutting edge of the insert for the sake of cam lobe faces of greater width can only be accommodated at the same density by an insert 64 which is oblong rather than square, as shown in FIG. 13, and which therefore can be indexed to only four cutting edges, rather than eight. The same cutting face geometry already described serves the insert 64, and a cutter so equipped, equally well, providing enhanced cutting geometry by the double-grooved configuration of the insert rake face, and the orientation of the insert in the cutter body with a positive inclination angle for slicing entry into the cut.

The loss of four cutting edges in the oblong form of insert 64 can have a beneficial trade off, however, in the somewhat greater insert density made possible by the narrower front-to-back dimension of the insert relative to cutting edge width. Practical considerations of chip clearance space and insert strength nevertheless limit the degree to which the insert can be narrowed. An increase in density of 5% (22 inserts versus 21) on a six-inch cutter diameter can be realized as cutting edge length of four-edge indexable inserts according to the invention are extended from ⅝ inch in eight-edge square inserts to ⅞ inch in four-edge oblong.

Figure 15:
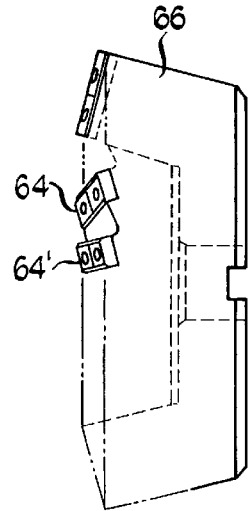
FIG. 15 is a side view thereof.

A further adaptation of the milling cutter of the invention is shown in FIGS. 14 and 15. The cutter body 66 is similar to the cutter body 20, previously described, in the sense that it is cup- or bowl-shaped although with heavier sidewalls to accommodate two oblong inserts 64 side-by-side in each pocket, and to handle the heavier cutting loads that result at the same cutting speeds and feeds, such cutters being designed for milling the lobes of the cam shafts of heavy-duty diesel engines.

Where two oblong inserts are used side-by-side as illustrated, the inserts of successive pockets are preferably offset from each other radially to avoid leaving a ridge on the workpiece in the event a non-cutting space should occur or develop at the meeting corners of two adjacent cutting edges of the same pocket.

The insert of the invention enables the tooling engineer to provide a plunge milling cutter of heretofore unrealized high cutting edge density by utilizing the "on-edge" or tangential form of insert whose preferred simple screw attachment to the insert pocket eliminates the peripheral space requirements of the wedge blocks and screws associated with radially-mounted blade type inserts, while at the same time preserving the strength and torsional rigidity of the cutter body by eliminating the deeply incised pockets required for radially-oriented blade type inserts. The achievement of this high cutting edge density, i.e., with the inserts so close peripherally, demands a high heeling angle to provide chip space for a curling chip of ductile metal, which would normally result in highly negative cutting geometry, absent the rake face geometry of the inserts of this invention.

Thus, the geometry of this invention neutralizes the disadvantageously negative cutting geometry that would otherwise accompany density, and results in smoother metal removal without excessive consumption of power. Moreover, the machining operation is accompanied with far less shock and noise than has been associated with the high metal removal rates demanded in this service because of the favorable cutting geometry and because, through most of the cutting cycle, there is always one cutting edge in the cut. The reduction of noise levels has obvious benefits for the attendants, and the reduction of shock can add significantly to the useful life of the milling machine.

In the preferred form of insert, namely the insert having square major faces, the cutting advantages specified are achieved with the economy of eight cutting edges on every insert. However, where wider cutting paths are required, as, for example, in milling the cam lobes of a sizeable diesel engine, larger square inserts on the same cutter diameter can only be accommodated at a reduced cutting edge density because of the larger peripheral space occupied by the insert. This, in turn, reduces the metal removal rate, i.e., the production rate.

Where favorable cutting edge density cannot be maintained with square inserts, the oblong form comes into its own by providing favorable cutting edge density while, whether mounted singly or doubly as shown, sweeping the wider cutting path. As production rates are thereby increased by reason of both factors, as compared with a square insert of equivalent cutting width, the loss of four cutting edges is balanced or outweighed by higher production rates. As each of these factors is accompanied by its own cost or value, optimal sizes and forms of insert can be determined for any application, other factors being equal.

The features of the improved plunge milling cutter and insert of the invention believed patentable are set forth in the following claims.

What is claimed is:

1. A high-density plunge milling cutter for milling camshafts, comprising:

a thick-walled cup-shaped body attachable to a drive spindle in driving engagement;

said cup-shaped body having a rim provided with a multiplicity of inclined seats each having therein a block shaped indexable cutting insert with its active cutting edge disposed to sweep a conical cutting path about an apex in front of the cutter and with said cutting edge disposed forwardly of a parallel radius of the cutter so as to move diagonally in a cut tangent to said conical cutting path;

each said insert seat comprising a principal seating surface which is pitched away from said cutting path both in the radially outward direction and in the circumferential direction opposite to the cutting direction, and an edge-seating surface perpendicular to said principal seating surface;

said block shaped insert comprising a hard cutting material of generally parallelepiped form having two parallel major plane surfaces serving respectively and interchangeably as a major seating face emplaced upon said principal seating surface and as a clearance face for the insert;

said insert also having opposed, plane parallel minor edge surfaces perpendicular to said major surfaces and serving respectively and interchangeably as a cutting face and an edge-seating surface of the insert emplaced against said edge-seating surface of said insert seat;

each insert also having therein a hole passing between said major surfaces and countersunk from each and a countersunk-head retainer passed through said hole and into said cutter to secure said insert in engagement with both said seating surfaces of said insert seat;

the clearance face of each insert receding from said conical cutting path to the bottom of the cutting face of the succeeding insert to form with said cutting path and said cutting face a triangular chip space for said succeeding insert;

said minor edge surfaces of each insert each having therein a pair of grooves each extending the full width of said minor edge surfaces parallel to said major surfaces adjacent thereto with a plane mid-portion of said edge surface between said pair of grooves;

said major plane surfaces of each insert having thereon adjacent to each of said minor edge surfaces a narrow land extending the full width of said minor edge surface, each said land making an acute exterior angle with said major plane surface and intersecting the adjacent groove of the adjacent minor edge surface at an acute angle to form therewith straight and parallel cutting edges along at least two opposite sides of each of said major plane surfaces, said disposition of said cutting edge relative to a parallel radius, and the rake of said groove at the cutting edge, resulting in positive effective shear in said cut.

2. The milling cutter of claim 1 wherein a third seating reference is provided for each insert by a pin in said cutter body perpendicular to said principal seating surface adjacent the radially inner edge thereof and projecting to a height above said principal seating surface less than that of the major clearance surface of said insert, said retainer urging said insert into engagement with said pin and said seating surfaces.

3. The cutter of claim 1 wherein the difference between said acute exterior angle and the pitch of said principal seating surface of the insert seat provides a net clearance angle of approximately seven degrees.

4. A high-density plunge milling cutter for milling camshafts, comprising:

a thick-walled cup-shaped body attachable to a drive spindle in driving engagement;

said cup-shaped body having a rim provided with a multiplicity of inclined insert pockets each comprising a plane seating surface tilted radially outwardly toward the base of said cup-shaped body and tilted toward said base in the peripheral direction opposite to the cutting direction of rotation;

an insert abutment surface rising from said seating surface at the edge thereof which is rearward relative to the cutting direction;

the edge of said abutment surface remote from said base being adjacent to the forward edge of the seating surface of the succeeding insert pocket;

identically shaped on-edge inserts in each of said multiplicity of pockets secured therein by a countersink head retainer passed through a countersunk hole in said insert and into said cutter body so as to clamp the insert against the seating and abutment surfaces of said pocket to assure transmission of the cutting forces from the insert to said tool body at the abutment surface of the pocket;

the chip-receiving space associated with each cutting insert being formed essentially by the edge surface of said insert facing in the cutting direction, the clearance surface of the immediately preceding insert, and the surface of the workpiece being cut; and said edge surface facing in the cutting direction having at least a portion providing positive effective shear adjacent to the cutting edge of the insert.

5. The milling cutter of claim 4 wherein said seating and abutment surfaces of each insert pocket are mutually perpendicular and each insert in overall form is essentially a parallelepiped engaged in surface-to-surface contact with the seating and abutment surfaces of one of said pockets.

6. The milling cutter of claim 4 wherein the insert pockets are open in both radial directions to permit through passage of a machining element to machine said seating and abutment surfaces.

7. The milling cutter of claim 6 wherein each insert pocket is flanked on its inner side by an upstanding pin mounted in said cutter body perpendicularly to said seating surface, said pin serving as the radially inward locator for the insert, and said retainer serving to clamp the insert against said seating and abutment surfaces and said pin.

* * * * *